United States Patent
Omdal

(10) Patent No.: US 11,268,362 B2
(45) Date of Patent: Mar. 8, 2022

(54) HYDROCARBON PRODUCTION THROUGH CREATION OF COLLAPSABLE CAVITIES BY ACID PLACEMENT THROUGH LATERAL CONDUITS

(71) Applicant: CONOCOPHILLIPS COMPANY, Houston, TX (US)

(72) Inventor: Edvard Omdal, Tananger (NO)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 17/166,176

(22) Filed: Feb. 3, 2021

(65) Prior Publication Data
US 2021/0246772 A1 Aug. 12, 2021

Related U.S. Application Data

(60) Provisional application No. 62/972,407, filed on Feb. 10, 2020.

(51) Int. Cl.
*E21B 43/16* (2006.01)
*E21B 43/27* (2006.01)
*C09K 8/72* (2006.01)

(52) U.S. Cl.
CPC ............. *E21B 43/16* (2013.01); *C09K 8/72* (2013.01); *E21B 43/27* (2020.05)

(58) Field of Classification Search
CPC .......... E21B 43/16; E21B 43/27; E21B 43/26; C09K 8/72
See application file for complete search history.

(56) References Cited

U.S. PATENT DOCUMENTS

| | | | |
|---|---|---|---|
| 5,328,067 | A | 7/1994 | Lalush |
| 6,024,171 | A * | 2/2000 | Montgomery ........ E21B 43/006 166/308.1 |
| 6,874,580 | B2 | 4/2005 | Montgomery |
| 8,037,937 | B2 | 10/2011 | Freyer |
| 2011/0203847 | A1 | 8/2011 | Randall et al. |
| 2014/0190685 | A1 | 7/2014 | Frazier et al. |
| 2016/0061017 | A1* | 3/2016 | Nguyen ................. C09K 8/66 166/280.2 |
| 2016/0290098 | A1* | 10/2016 | Marya .................. E21B 34/063 |
| 2017/0145303 | A1* | 5/2017 | Fontenelle ............... C09K 8/92 |

FOREIGN PATENT DOCUMENTS

EP 2818626 A1 12/2014

OTHER PUBLICATIONS

"Matrix Acidizing" by Petrowiki, 2015, https://petrowiki.spe.org/Matrix_acidizing; 6 pgs.
International Search Report for PCT/US2021/016302, dated Apr. 20, 2021; 2 pgs.

* cited by examiner

Primary Examiner — Silvana C Runyan
(74) Attorney, Agent, or Firm — Conocophillips Company

(57) ABSTRACT

The invention relates to the completion of hydrocarbon wells using acid. It is known to create cavities in the formation using acid, which then collapse to leave a highly permeable region for production of hydrocarbons. An issue with this technique can be that the wellbore/tubing adjacent the cavity is damaged. The invention involves passing thin conduits through the formation transversely of the main wellbore, through which conduits acid is delivered to create unstable cavities at a distance from the main wellbore thereby stimulating production without risking instability of the main wellbore.

8 Claims, 1 Drawing Sheet

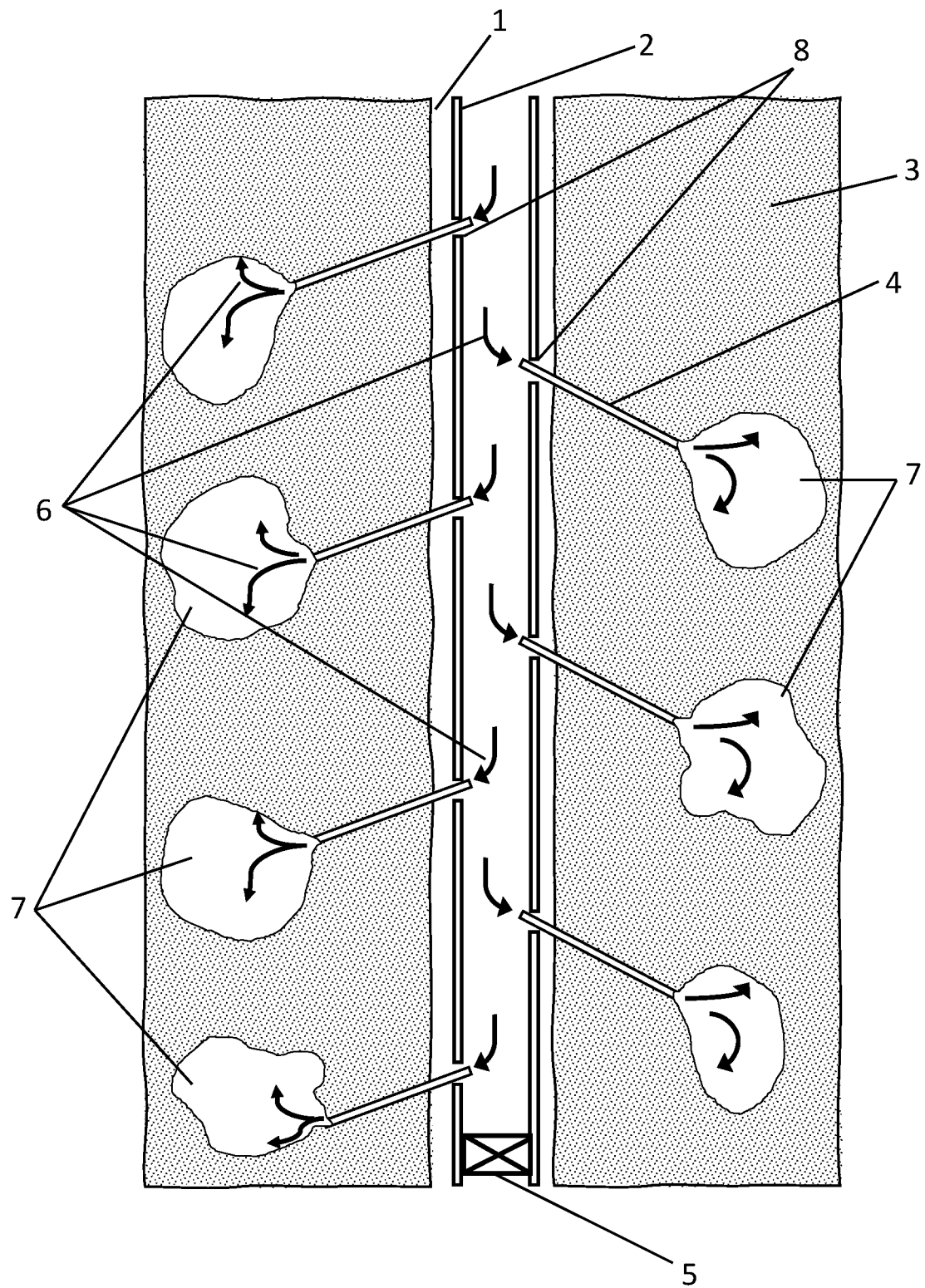

HYDROCARBON PRODUCTION THROUGH CREATION OF COLLAPSABLE CAVITIES BY ACID PLACEMENT THROUGH LATERAL CONDUITS

CROSS-REFERENCE TO RELATED APPLICATIONS

This application is a non-provisional application which claims benefit under 35 USC § 119(e) to U.S. Provisional Application Ser. No. 62/972,407 filed Feb. 10, 2020 entitled "IMPROVED HYDROCARBON PRODUCTION THROUGH ACID PLACEMENT," which is incorporated herein in its entirety.

STATEMENT REGARDING FEDERALLY SPONSORED RESEARCH

None.

FIELD OF THE INVENTION

This invention relates to the acid stimulation of rock formations for production of hydrocarbons.

BACKGROUND OF THE INVENTION

In order to stimulate production of hydrocarbons in certain types of rock formation, e.g. chalk, acid is injected into the formation to dissolve away some of the rock and thereby increase the flow rate and volume of hydrocarbons from the rock.

Acid stimulation is normally envisaged as a technique for creating small fissures, opening up existing fissures or, in combination with hydraulic fracturing, enhancing the fracture conductivity. The technique of acid stimulation involves acid injection at high pressure over a relatively short time, but an alternative approach is described in U.S. Pat. No. 6,874,580 in the name of the applicant. In the approach described in U.S. Pat. No. 6,874,580, acid is injected through perforations in the production casing in order to dissolve away a cavity in the rock formation which is large enough to make the surrounding rock unstable, with the intention that the rock will collapse into the cavity and thereby create a highly permeable region of fractured rock from and through which hydrocarbons will flow readily.

The U.S. Pat. No. 6,874,580 approach has met with some success in terms of increasing production. However, when the cavities collapse, e.g. when the well is put on production, this can create excessive stresses on the steel casing of the well causing damage which may put the well out of operation or at least cause problems with future well operations which require a tool to be passed down the well which may be too constricted to allow passage of the tool.

Another approach to enhancing acid stimulation, which is based on the conventional understanding of seeking to open up existing fractures, is to provide tubing or conduits extending laterally from the main wellbore to distribute acid further into the formation. The tubing is mechanically advanced out of the main well casing whilst delivering acid from the tip of the tubing; in this way it dissolves its own path through the formation. Wells completed in this way can have many such lateral tubes each extending several metres into the formation. Acid can then be delivered to the formation from the ends of the tubes and through apertures along the length of each tube. This technique for increasing the volume of rock which is exposed to acid has met with success. It is commonly known as "Fishbones" (a registered trademark of Fishbones AS) and is described for example in European patent number EP2818626B1.

U.S. Pat. No. 8,037,937B2, also in the name of Fishbones A S, describes using similar tubing or conduits extending within the main wellbore to deliver acid to selected parts of the wellbore. This process is described in U.S. Pat. No. 8,037,937B2 as being an improvement over the method described in U.S. Pat. No. 6,874,580 (ConocoPhillips) for dissolving acid in the formation immediately adjacent the wellbore.

BRIEF SUMMARY OF THE DISCLOSURE

The invention more particularly includes a method for stimulating production from a hydrocarbon-bearing rock formation having a wellbore drilled in the formation, the method comprising: a) passing tubing into the wellbore, wherein the tubing has housed within it at least one flexible conduit of smaller diameter than the tubing, and more preferable a plurality of such conduits; b) passing acid under pressure through the tubing and through the or each conduit and then into the formation; c) passing the conduit or conduits through the formation, such that the conduit extends laterally with respect to the wellbore and the conduit communicates between the interior of the tubing and the formation; d) continuing to pass acid into the formation until a cavity is created adjacent distal end of the conduit; e) initiating production of hydrocarbons from the wellbore, including allowing the cavity to collapse.

The conduit(s) may be withdrawn after formation of a cavity and then re-inserted into the formation in a different place. In this event when the well is put on production, hydrocarbons flow along the channel created by the conduit rather than along the conduit itself. However, it is preferred just to leave the conduits in place.

Preferably, acid is only delivered through the distal end of the conduit (i.e. the end remote from the main tubing) to create a cavity. Delivery of acid is continued until a cavity is created of a sufficient size to be unstable and collapse when pressure is taken off or acid stops being delivered or the well is put on production.

Examples and various features and advantageous details thereof are explained more fully with reference to the exemplary, and therefore non-limiting, examples illustrated in the accompanying drawings and detailed in the following description. Descriptions of known starting materials and processes can be omitted so as not to unnecessarily obscure the disclosure in detail. It should be understood, however, that the detailed description and the specific examples, while indicating the preferred examples, are given by way of illustration only and not by way of limitation. Various substitutions, modifications, additions and/or rearrangements within the spirit and/or scope of the underlying inventive concept will become apparent to those skilled in the art from this disclosure.

As used herein, the term "distal" means remote from, or more remote (relative to another point) from the wellbore. "Proximal" means near to or nearer (relative to another point) to the wellbore.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term substantially, as used herein, is defined to be essentially conforming to the particular dimension, shape or other word that substantially modifies, such that the component need not be exact. For example, substantially cylindrical means that the object resembles a cylinder, but can have one or more deviations from a true cylinder.

Additionally, any examples or illustrations given herein are not to be regarded in any way as restrictions on, limits to, or express definitions of, any term or terms with which they are utilized. Instead these examples or illustrations are to be regarded as being described with respect to one particular example and as illustrative only. Those of ordinary skill in the art will appreciate that any term or terms with which these examples or illustrations are utilized encompass other examples as well as implementations and adaptations thereof which can or cannot be given therewith or elsewhere in the specification and all such examples are intended to be included within the scope of that term or terms. Language designating such non-limiting examples and illustrations includes, but is not limited to: "for example," "for instance," "e.g.," "In some examples," and the like.

Although the terms first, second, etc. can be used herein to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the present inventive concept.

While preferred examples of the present inventive concept have been shown and described herein, it will be obvious to those skilled in the art that such examples are provided by way of example only. Numerous variations, changes, and substitutions will now occur to those skilled in the art without departing from the disclosure. It should be understood that various alternatives to the examples of the disclosure described herein can be employed in practicing the disclosure. It is intended that the following claims define the scope of the disclosure and that methods and structures within the scope of these claims and their equivalents be covered thereby.

BRIEF DESCRIPTION OF THE DRAWINGS

A more complete understanding of the present invention and benefits thereof may be acquired by referring to the follow description taken in conjunction with the accompanying drawings in which:

FIG. 1 is a highly schematic sectional view of a wellbore lined with steel casing and acid being delivered in accordance with the invention.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

As shown in FIG. 1, a hydrocarbon-bearing formation 3 has a wellbore 1 drilled in it. FIG. 1 shows only a portion of the wellbore 1 which is in the producing region of the formation 3. Tubing 2 has been passed into the wellbore in this region for the purpose of "completion". The completion tubing 2 has pre-formed apertures 8 spaced along its length. Within the tubing (not shown but as described in EP2818626B1, incorporated by reference) is a mechanism for extending lengths 4 of small diameter, relatively flexible metal conduit (e.g. of titanium or steel or an alloy) through the apertures 8 and into the rock. A packer 5 is installed at the lower end of the producing region. Acid is then delivered under pressure as the lengths 4 of conduit are advanced, thereby dissolving away a passage through which each length of conduit 4 can pass.

Once the conduit has reached its maximum extent, acid continues to be delivered with the effect of dissolving away the formation in the region around the tip of the extended length of conduit 4, thereby forming a cavity in the formation.

A conventional volume of acid for an acid fracturing operation might be in the range of about 1 bbl (159 liters) per foot (0.305 m) of producing region of well. This is enough acid to create or enlarge fractures in the rock without causing structural damage to the rock which is normally thought to be undesirable.

In the method according to the invention, acid (see arrows 6) continues to be delivered until an unstable cavity 7 has been created at the end of each length 4 of conduit. This may mean injecting several times the normal amount of acid.

The preferred type and strength of acid for the invention is 28% by volume hydrochloric acid, sometimes referred to as muriatic acid. Hydrochloric acid is available from a large number of commercial suppliers in a variety of concentrations, ranging from 1 N up to 12 N, 10-38% by volume, or 10-38 g HCl per 90-62 g water. Conventional stimulation would normally employ 15% hydrochloric. However, the invention may work with a range of concentrations, e.g. 15 to 38% or 20 to 32% by volume.

It is not yet certain what the most desirable size of cavity is, and this may well vary depending on the formation. However, an estimate this stage is that the size of cavity to be created could have a volume of between 0.25 $m^3$ to 4 $m^3$, optionally from 0.5 $m^3$ to 2 $m^3$, e.g. about 1 $m^3$. Again, it is not yet certain how much acid is required to make a cavity of this size, and this may depend on the formation.

The lengths 4 of conduit remain in the formation once the desired volume of acid has been delivered and the acid delivery operation is complete. The dissolved cavity may start to collapse at this point, or even whilst acid is being delivered. However, it is expected that the cavity will remain generally stable until the well is put on production.

The completion tubing 2 remains in place and serves as production as the well is put on production. Putting the well on production involves removing some or all of the applied pressure (e.g. by gradually opening the choke valve at the top of the well), allowing the fluids in the formation to be produced to the surface under natural pressure in the formation. This reduction of pressure in the cavities 7 allows the cavities 7 to collapse, or rather the rock formation around the cavities to collapse into the cavities. This process creates a highly fractured region at the end of each length 4 of tubing and thus enhanced production. In addition, the risk of damage to the liner 2 caused by creating cavities adjacent the liner is greatly diminished.

In a modified embodiment, flexible hose may be used in place of the metal conduits 4. The flexible hose has sufficient rigidity to be advanced through the rock as acid is delivered through its distal end, dissolving away a channel through which it may pass. However, hose (e.g. of rubber or synthetic polymer or composite material) can be flexible enough to be withdrawn and then advanced again in a different location. In this way a series of small diameter side channels, each with a collapsible cavity at the end, may be created sequentially. This technique is known as "radial jet drilling".

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. U.S. Pat. No. 6,874,580, Method for Enhancing Well Productivity (2004).
2. U.S. Pat. No. 8,037,937, Method and a Device for Solvent Injection in a Subsurface Well (2009).
3. EP2818626, An Improved Method and Device for Making a Lateral Opening Out of a Wellbore (2014).

The invention claimed is:

1. A method for stimulating production from a hydrocarbon-bearing rock formation having a wellbore drilled in the formation, the method comprising:
 a) passing tubing into a wellbore in a rock formation, wherein the tubing has pre-formed apertures along its length, and has housed within it at least one conduit of smaller diameter than the tubing, the conduit having a proximal end and a distal end and the conduit being sufficiently flexible for the conduit to be passed, distal end first, through one of said apertures in the tubing in a lateral direction with respect to the wellbore;
 b) passing the conduit through the aperture in the tubing whilst passing acid under pressure through the tubing and through the conduit and then into the formation;
 c) whilst delivering acid under pressure through the conduit, advancing the conduit and dissolving away the formation to form a lateral passage through the formation, thereby passing the said conduit through the formation in a lateral direction with respect to the wellbore;
 d) after the conduit has advanced to a maximum extent, continuing to pass acid into the formation until a cavity is created adjacent the distal end of the conduit,
 e) initiating production of hydrocarbons from the wellbore, including allowing the cavity to collapse.

2. The method as claimed in claim 1, wherein a plurality of lateral conduits are passed through the formation by advancing them laterally through acid-dissolved passages and acid is passed into the formation through the plurality of conduits, thereby creating a plurality of cavities.

3. The method as claimed in claim 1, wherein after a conduit is passed through the formation by advancing it laterally through an acid-dissolved passage and acid passed along the conduit and a cavity is created, the conduit is withdrawn and then passed back into the formation at a different location in the wellbore and a further cavity formed.

4. The method as claimed in claim 1, wherein the acid is passed only or primarily from the distal end of the conduit or conduits.

5. The method as claimed in claim 1 wherein one or more cavities are created each having a volume selected from between 0.25 $m^3$ and 4 $m^3$.

6. The method as claimed in claim 1, wherein the acid is hydrochloric acid with a concentration selected from 15% to 38% by volume.

7. The method as claimed in claim 1, wherein the tubing is left in place when the wellbore is put on production, and hydrocarbons are produced through the tubing.

8. The method as claimed in claim 1, wherein one or more conduits are left in place when the wellbore is put on production and hydrocarbons are produced through at least one conduit.

* * * * *